United States Patent
Nakanishi

(10) Patent No.: US 10,823,976 B2
(45) Date of Patent: Nov. 3, 2020

(54) OPTICAL STRUCTURE

(71) Applicant: HAMAMATSU PHOTONICS K.K., Hamamatsu (JP)

(72) Inventor: Atsushi Nakanishi, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 473 days.

(21) Appl. No.: 15/854,858

(22) Filed: Dec. 27, 2017

(65) Prior Publication Data
US 2018/0196276 A1    Jul. 12, 2018

(30) Foreign Application Priority Data
Jan. 6, 2017    (JP) .................................. 2017-001348

(51) Int. Cl.
*G02B 27/28*    (2006.01)
*G02B 27/42*    (2006.01)
(Continued)

(52) U.S. Cl.
CPC ......... *G02B 27/283* (2013.01); *G02B 5/1814* (2013.01); *G02B 27/0944* (2013.01);
(Continued)

(58) Field of Classification Search
CPC .............. G02B 27/283; G02B 27/0944; G02B 27/4233; G02B 27/4255; G02B 27/4272; G02B 27/42; G02B 27/4244; G02B 27/1086; G02B 27/44; G02B 27/46; G02B 27/1006; G02B 27/1073; G02B 27/10;
(Continued)

(56) References Cited

U.S. PATENT DOCUMENTS 4,155,647 A    5/1979  Michel
5,080,486 A *  1/1992  Shirasaki ............. G02B 27/283
                                             356/327

FOREIGN PATENT DOCUMENTS

CN        1485647 A      3/2004
JP        H11-007650 A   1/1999

OTHER PUBLICATIONS

Wong, Gerald et al., "Achromatization of Wollaston polarizing beam splitters," Optics Letters, vol. 36, No. 8, 2011, pp. 1332-1334.
(Continued)

*Primary Examiner* — Stephone B Allen
*Assistant Examiner* — Adam W Booher
(74) *Attorney, Agent, or Firm* — Faegre Drinker Biddle & Reath LLP

(57) ABSTRACT

Provided is an optical structure 100 that includes: a polarizing beam splitter A which splits input light input from an incoming plane thereof into first polarized light and second polarized light and in which split angles, which are angles formed by traveling directions of rays of the first polarized light and traveling directions of rays of the second polarized light, are acute angles; and a diffractive optical element B which is disposed at a stage subsequent to the polarizing beam splitter A and has a plurality of light transmission regions separated at a prescribed pitch. Since the diffractive optical element B having a prescribed pitch is used, the diffractive optical element B can perform deflection while having a smaller size than a Wollaston prism, and application to various fields is expected.

12 Claims, 13 Drawing Sheets

(51) Int. Cl.
*G02B 27/09* (2006.01)
*G02B 5/18* (2006.01)

(52) U.S. Cl.
CPC ..... *G02B 27/4233* (2013.01); *G02B 27/4255* (2013.01); *G02B 27/4272* (2013.01); *G02B 2005/1804* (2013.01)

(58) Field of Classification Search
CPC ........ G02B 5/1814; G02B 5/189; G02B 5/18; G02B 5/1819; G02B 5/1838; G02B 2005/1804
See application file for complete search history.

(56) References Cited

OTHER PUBLICATIONS

Michael W. Kudenov et al., "Achromatic Wollaston prism beam splitter using polarization gratings, Optics Letters," US, The Optical Society, Oct. 1, 2016, vol. 41, No. 19, pp. 4461-4463.

\* cited by examiner

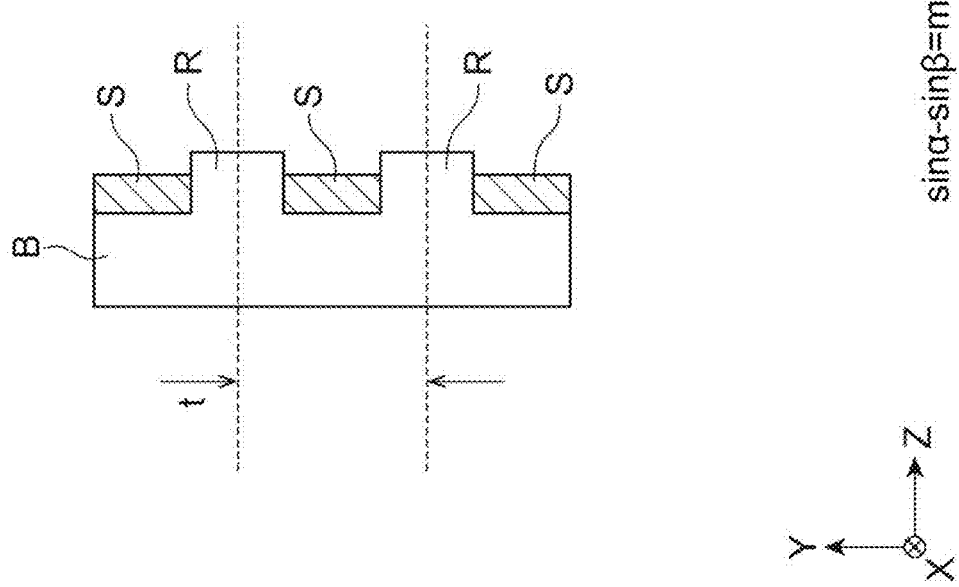
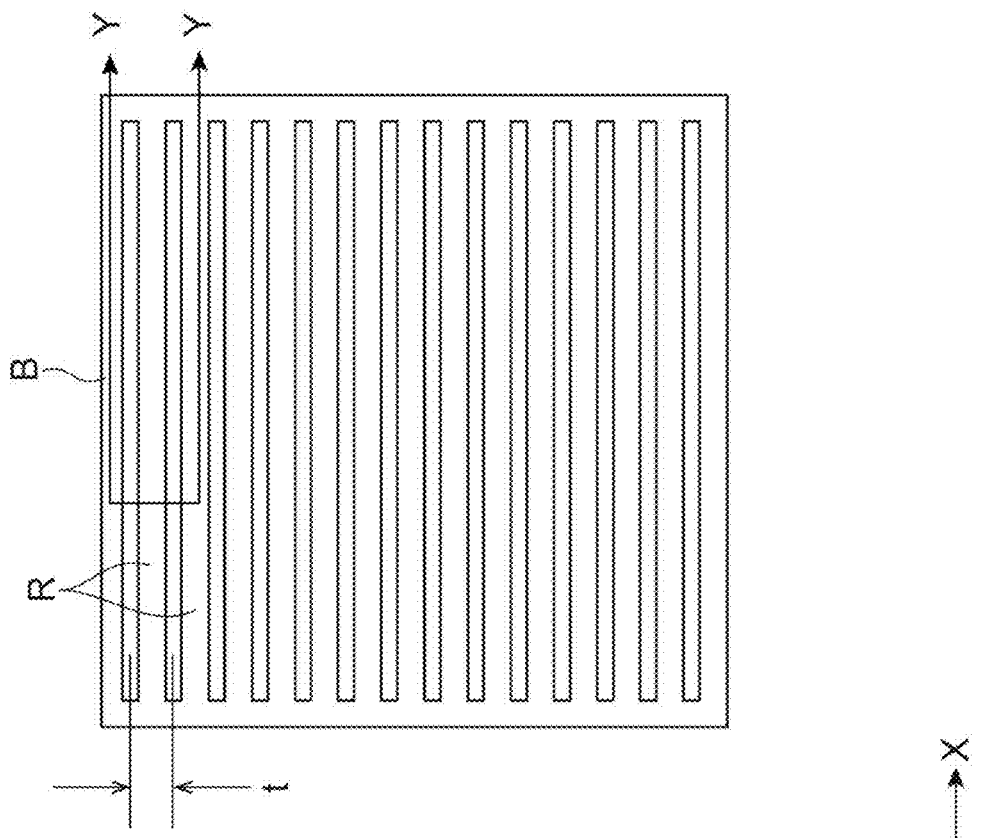
$\sin\alpha - \sin\beta = m\lambda/t$

OPTICAL STRUCTURE

BACKGROUND OF THE INVENTION

Field of the Invention

The present invention relates to an optical structure capable of monitoring a position of invisible light.

Related Background Art

In recent years, image capturing using terahertz waves has been anticipated in fields such as security inspection, biotechnology, and so on. In these fields, it is thought that particularly polarized imaging for spitting terahertz waves into (rays of) ordinary light and (rays of) extraordinary light to perform image capturing will be useful.

Meanwhile, terahertz waves are invisible light, and thus positions of rays of this light cannot be accurately determined. When an attempt is made to distinguish the positions of rays of this light, a method of inputting guide light to be monitored on the same axis as the invisible light may be conceived.

As a method of monitoring a position of light, a method of making use of an optical structure as described in Non-Patent Literature 1 may be conceived. In Non-Patent Literature 1, a Wollaston prism is coupled to another Wollaston prism at a stage subsequent thereto. In the same literature, there is a proposal for an optical structure in which rays of light of different wavelengths are output at the same split angle in spite of being polarized and split.

[Non-Patent Literature 1] Gerald Wong, Roger Pilkington, and Andrew R. Harvey, "Achromatization of Wollaston polarizing beam splitters," Optics Letters Vol. 36, Issue 8, pp 1332-1334 (2011)

SUMMARY OF THE INVENTION

However, in the case of this conventional method, since a plurality of Wollaston prisms are coupled together, there is a problem that the optical structure is made large.

The present invention has been made in view of this problem, and an object thereof is to provide an optical structure that is not made large while monitoring a position of invisible light.

To solve the above problems, a first optical structure includes: a polarizing beam splitter which splits input light input from an incoming plane thereof into first polarized light and second polarized light and in which split angles, which are angles formed by traveling directions of rays of the first polarized light and by traveling directions of rays of the second polarized light, are acute angles; and diffractive optical element which is disposed at a stage subsequent to the polarizing beam splitter and has a plurality of light transmission regions separated at a prescribed pitch. When first input light having a first wavelength ($\lambda 1$) is input to the polarizing beam splitter, and when second input light having a second wavelength ($\lambda 2$) is input to the polarizing beam splitter, the prescribed pitch of the diffractive optical element is set such that the traveling direction of the first polarized light of the first input light and the traveling direction of the first polarized light of the second input light coincide with each other, and the traveling direction of the second polarized light of the first input light and the traveling direction of the second polarized light of the second input light coincide with each other.

The polarizing beam splitter splits the first polarized light and the second polarized light at an acute angle. Thereby, the traveling directions are easily corrected by the diffractive optical element of the subsequent stage. Since diffraction effects of the diffractive optical element differ according to a wavelength, when rays of light of different wavelengths are input, a degree to which the light is deflected can be changed. Therefore, when the first input light and the second input light are input, the traveling directions of the rays of first polarized light of the light of different wavelengths can be made to coincide with each other, and the traveling directions of the rays of second polarized light of the light of different wavelengths can be made to coincide with each other. If one of the wavelengths is set for invisible light, and if the other wavelength located in a band discontinuous to this is set for visible light, the invisible light and the visible light that are input to the polarizing beam splitter on the same axis are made to travel on an outgoing plane of the diffractive optical element in the same direction. Therefore, a position of the visible light is monitored, and thereby a position of the invisible light can be monitored.

Here, since the diffractive optical element uses a diffraction phenomenon of light of a desired wavelength, deflection can be performed with it having a smaller size than a Wollaston prism.

In a second optical structure, the light transmission regions of the diffractive optical element constitute a single pattern; all of the first polarized light of the first input light, the first polarized light of the second input light, the second polarized light of the first input light, and the second polarized light of the second input light are disposed to be incident upon the single pattern of the diffractive optical element; $\lambda 2$ is shorter than $\lambda 1$; and the prescribed pitch (t) of the single pattern, an incoming angle ($\alpha_{11}$) and an outgoing angle ($\beta_{11}$) of the first polarized light of the first input light for the diffractive optical element, an incoming angle ($\alpha_{12}$) and an outgoing angle ($\beta_{12}$) of the second polarized light of the first input light for the diffractive optical element, an incoming angle ($\alpha_{21}$) and an outgoing angle ($\beta_{21}$) of the first polarized light of the second input light for the diffractive optical element, and an incoming angle ($\alpha_{22}$) and an outgoing angle ($\beta_{22}$) of the second polarized light of the second input light for the diffractive optical element satisfy the relational formulae: $|\sin \alpha_{11} - \sin \beta_{11}| \neq m_{11}\lambda 1/t$, $|\sin \alpha_{12} - \sin \beta_{12}| \neq m_{12}\lambda 1/t$, $|\sin \alpha_{21} - \sin \beta_{21}| = m_{21}\lambda 2/t$, and $|\sin \alpha_{22} - \sin \beta_{22}| = m_{22}\lambda 2/t$ when $m_{11}$, $m_{12}$, $m_{21}$, and $m_{22}$ are set to arbitrary natural numbers.

In this case, the first wavelength ($\lambda 1$) does not satisfy diffraction conditions and thus is not diffracted, and the second wavelength ($\lambda 2$) satisfies the diffraction conditions and thus is diffracted. The traveling directions can easily be made to coincide with each other.

In a third optical structure, the diffractive optical element includes first diffractive optical element having a first pattern made up of some of the plurality of light transmission regions, and second diffractive optical element having a second pattern made up of the others of the plurality of light transmission regions; the first polarized light of the first input light, and the first polarized light of the second input light are disposed to be incident upon the first pattern of the first diffractive optical element; the second polarized light of the first input light, and the second polarized light of the second input light are disposed to be incident upon the second pattern of the second diffractive optical element; and a pitch (t1) of the first pattern of the first diffractive optical element, a pitch (t2) of the second pattern of the second diffractive optical element, an incoming angle ($\alpha_{21}$) and an outgoing angle ($\beta_{21}$) of the first polarized light of the second input light for the first diffractive optical element, and an incoming angle ($\alpha_{22}$) and an outgoing angle ($\beta_{22}$) of the second polarized light of the second input light for the second diffractive optical element satisfy the following relational formulae: $t1 \neq t2$, $|\sin \alpha_{21} - \sin \alpha_{21}| = m_{21}\lambda2/t1$, and $|\sin \alpha_{22} - \sin \beta_{22}| = m_{22}\lambda2/t2$ when $m_{21}$ and $m_{22}$ are set to arbitrary natural numbers.

In this case, since the first polarized light and the second polarized light with the second wavelength ($\lambda2$) can be controlled with different diffraction conditions, an angle of deflection caused by diffraction can be easily adjusted, and the coincidence of the traveling directions can be easily achieved.

In a fourth optical structure, the polarizing beam splitter and the diffractive optical element are integrated without a junction plane. In the case of this configuration, there are effects that it is not necessary to adhere the diffractive optical element to a Wollaston prism, an angle deviation at the time of adhesion between the diffractive optical element and the polarizing beam splitter is minimized, and a loss of light or the like resulting from a refractive index difference between an adhesive and a member is minimized.

In a fifth optical structure, the diffractive optical element is a diffraction grating or a spatial light modulator.

Since the diffraction grating is an easily available component, production is simple. Since the spatial light modulator. can form a desired diffraction pattern according to an input signal, desired deflection can be performed.

According to the optical structure of the present invention, a position of invisible light can be monitored.

BRIEF DESCRIPTION OF THE DRAWINGS

FIG. 5A is a plan diagram of the diffraction grating, and FIG. 5B is a diagram illustrating a cross-sectional configuration of the diffraction grating.

DESCRIPTION OF THE PREFERRED EMBODIMENT

Hereinafter, an optical structure according to an embodiment will be described. Identical or equivalent elements are given the same reference signs, and duplicate description thereof will be omitted.

Figure 1:
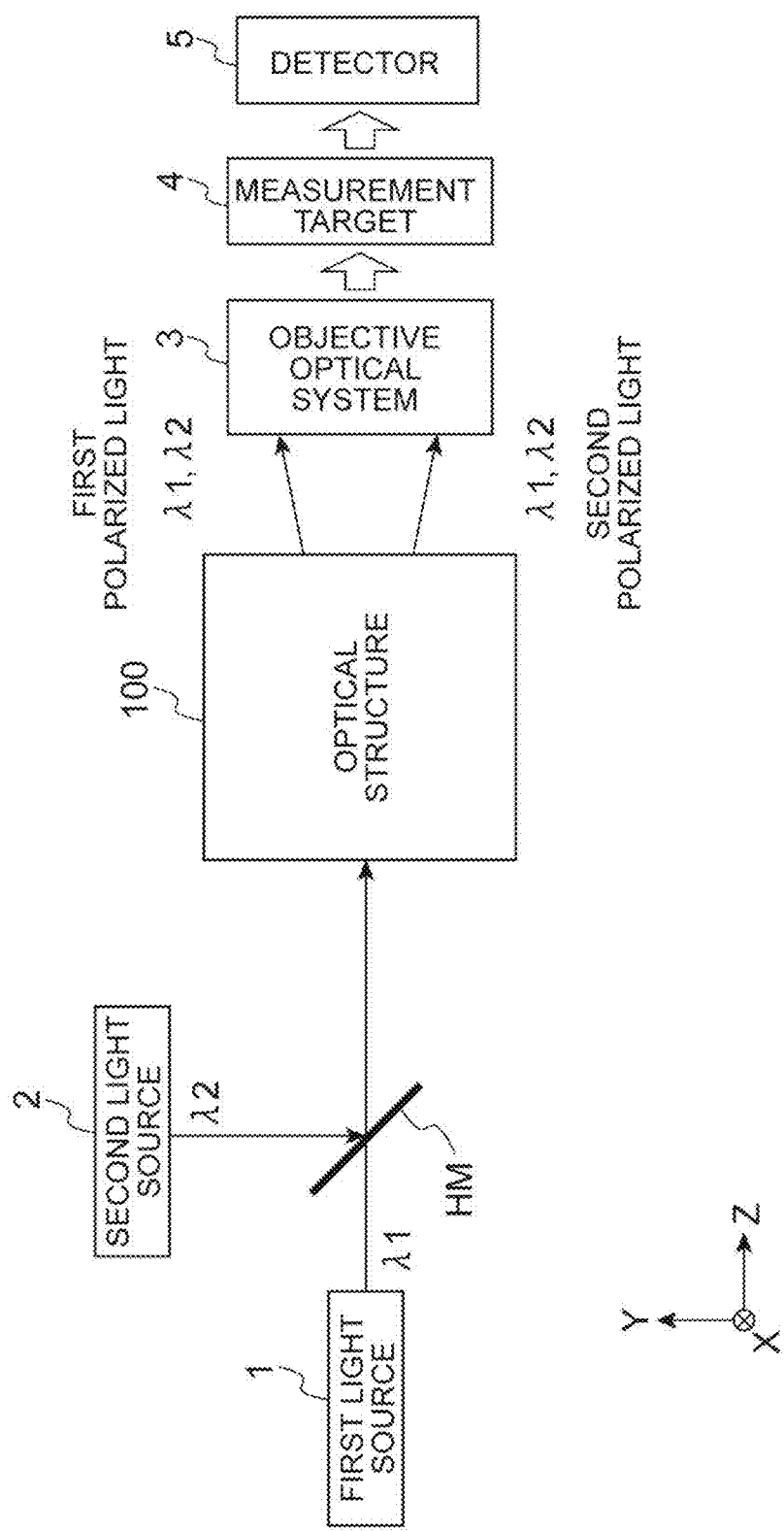
FIG. 1 is a diagram illustrating a detecting device using an optical structure.

FIG. 1 is a diagram illustrating a detecting device using an optical structure.

This detecting device includes a first light source 1 that emits a terahertz wave (first input light) of a first wavelength $\lambda1$ used for inspection, a second light source 2 that emits monitoring light (second input light) of a second wavelength $\lambda2$ such as visible light, and an optical structure 100 that splits each input light input from these light sources into first polarized light and second polarized light in which directions of vibration of electric fields are orthogonal to each other and that emits the split rays of light. The terahertz wave of the first wavelength $\lambda1$ and the monitoring light of the second wavelength $\lambda2$, both of which are output from these light sources, are coaxially propagated via a half mirror HM, and are incident upon the optical structure 100. A direction of the propagation is defined as a direction of the Z axis, a direction perpendicular to a Z axis is defined as an X axis, and a direction perpendicular to both of the Z axis and the X axis is defined as a Y axis. The XYZ axes constitute a three-dimensional orthogonal coordinate system.

The terahertz wave split into the first polarized light and the second polarized light by the optical structure 100 is applied to a measurement target 4 via an objective optical system 3 such as an objective lens, a collimator lens, or the like. The measurement target 4 may be various objects, for instance a biological sample, and so on. The terahertz wave passing through the measurement target 4 is detected by a detector 5. When being incident upon the measurement target 4, the terahertz wave is split into the first polarized light and the second polarized light having orientations of polarization perpendicular to each other, and thus information about the measurement target 4 can be obtained from a phase difference when these pass through the measurement target 4. If a detector is sensitive to the first and second wavelengths $\lambda1$ and $\lambda2$, a solid-state imaging device such as a CCD or a MOS image sensor, or a photomultiplier tube, a bolometer, a pyrodetector, a plasma wave base detector, a Schottky barrier diode, a superconductive detector, etc. may be used as the detector 5 in addition to a photodetector such as a photodiode.

The optical structure 100 splits the input light into the first polarized light and the second polarized light. A polarizing beam splitter is installed in the optical structure 100, and the first polarized light and the second polarized light become ordinary light and extraordinary light when split. The ordinary light and the extraordinary light are two rays of light that have orientations of polarization that are orthogonal to each other (the directions of vibration of electric fields are orthogonal to each other) when the two rays of light travel into a birefringent crystal. In a case in which the birefringent crystal is considered as an indicatrix, if an axis having the same refractive index distribution in a traveling direction is defined as an optical axis, the ordinary light is light that vibrates in a direction perpendicular to the optical axis, and the extraordinary light is light that vibrates in a direction perpendicular to the ordinary light. The optical structure 100 includes a polarizing splitter such as a polarizing beam splitter at an initial stage. When output by the polarizing splitter, the ordinary light is set as the first polarized light, and the extraordinary light is set as the second polarized light.

Hereinafter, the optical structure 100 will be described, but an optical structure 100 of a comparative example will be described first.

Figure 2:
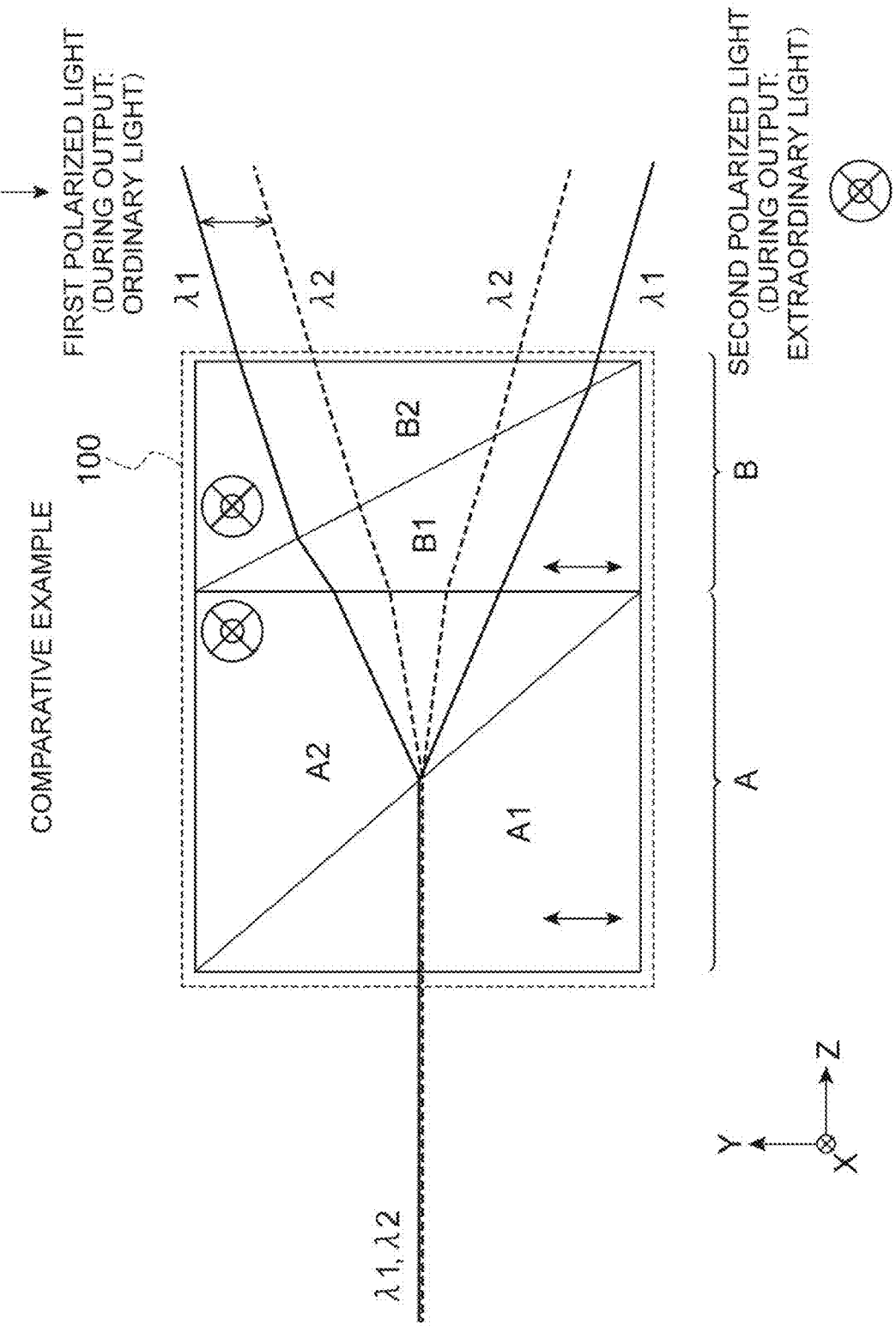
FIG. 2 is a diagram illustrating an optical structure according to a comparative example.

FIG. 2 is a diagram illustrating an optical structure according to a comparative example.

This optical structure 100 includes a polarizing beam splitter A and diffractive optical element B. When rays of light having different wavelengths (a first wavelength $\lambda 1$ and a second wavelength $\lambda 2$) are incident upon a light incoming plane of the polarizing beam splitter A, each of the rays of light is split into first polarized light and second polarized light, and is incident upon the optical member of the diffractive optical element B. The diffractive optical element B also forms a separation angle compensator. The separation angle compensator makes traveling directions of the rays of light having different wavelengths identical to each other, and emits the first polarized light (the ordinary light) and the second polarized light (the extraordinary light) from a light outgoing plane at each of wavelengths thereof.

The polarizing beam splitter A is a Wollaston prism, and has a function of splitting incident light into ordinary light and extraordinary light. The diffractive optical element B is also a Wollaston prism, and when an inclined angle of a block junction plane constituting the prism, refractive indexes, and a thickness are appropriately adjusted, the traveling directions of the rays of light having different wavelengths (the first wavelength $\lambda 1$ and the second wavelength $\lambda 2$) can be made identical to each other. However, since a plurality of Wollaston prisms are coupled together, the optical structure is made large.

Figure 3:
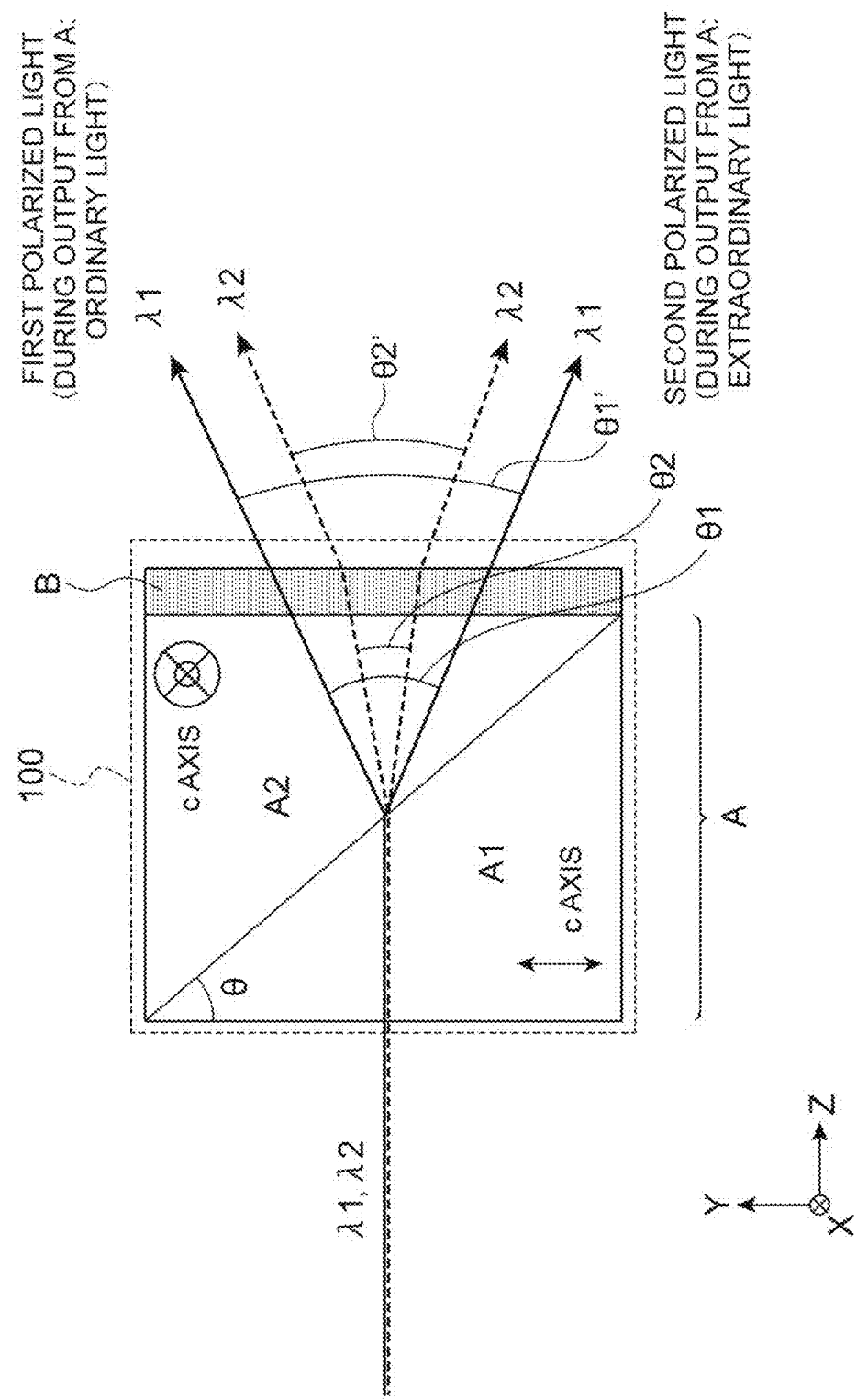
FIG. 3 is a diagram illustrating an optical structure according to an embodiment.

FIG. 3 is a diagram illustrating an optical structure according to a first embodiment.

An optical structure 100 includes a polarizing beam splitter A that splits input light input from an incoming plane into first polarized light and second polarized light, and diffractive optical element B (diffraction means: a diffraction grating or a spatial light modulator) that is disposed at a stage subsequent to the polarizing beam splitter A and has a plurality of light transmission regions separated at a prescribed pitch. Split angles in the polarizing beam splitter A, which are angles formed by the traveling directions of the rays of first polarized light and by the traveling directions of the rays of the second polarized light, are acute angles. The diffractive optical element B of FIG. 3 is a diffraction grating, but it may be a spatial light modulator. that displays a diffraction grating pattern.

When first input light having a first wavelength $\lambda 1$ is input to the polarizing beam splitter A, and second input light having a second wavelength $\lambda 2$ is input to the polarizing beam splitter A, the prescribed pitch in the diffractive optical element B is set such that the traveling direction of the first polarized light of the first input light (of the first wavelength $\lambda 1$) and the traveling direction of the first polarized light of the second input light (of the second wavelength $\lambda 2$) coincide with each other, and the traveling direction of the second polarized light of the first input light and the traveling direction of the second polarized light of the second input light coincide with each other.

The polarizing beam splitter A splits the first polarized light and the second polarized light at an acute angle. Thereby, the traveling directions are easily corrected by the diffractive optical element B of the subsequent stage. Since diffraction effects of the diffractive optical element B differ according to wavelength, when rays of light of different wavelengths are input, a degree to which the light is deflected can be changed. Therefore, when the first input light and the second input light are input, the traveling directions of the rays of first polarized light of the light of different wavelengths $\lambda 1$ and $\lambda 2$ can be made to coincide with each other, and the traveling directions of the rays of second polarized light of the light of different wavelength $\lambda 1$ and $\lambda 2$ can be made to coincide with each other. If one of the wavelengths is set for invisible light (a terahertz wave), and the other wavelength located in a band discontinuous to this is set for visible light (monitoring light), the invisible light and the visible light that are input to the polarizing beam splitter A on the same axis are made to travel on an outgoing plane of the diffractive optical element in the same direction. Therefore, a position of the visible light is monitored, and thereby a general position of the invisible light can be monitored.

Here, since the diffractive optical element B uses a diffraction phenomenon of light of a desired wavelength, deflection can be performed with it having a smaller size than a Wollaston prism.

First, a structure of the polarizing beam splitter A will be further described.

The polarizing beam splitter A of this example is a Wollaston prism, and splits the first polarized light and the second polarized light at an acute angle. To be specific, the polarizing beam splitter A includes a first prism block A1 and a second prism block A2 along a transfer path of light. An optical axis (a c axis) of the first prism block A1 is parallel to the Y axis, and an optical axis (a c axis) of the second prism block A2 is parallel to the X axis.

When being incident upon the optical structure 100, the first polarized light is linearly polarized light in which the direction of vibration of the electric field is parallel to the Y axis, and the second polarized light is linearly polarized light in which the direction of vibration of the electric field is parallel to the X axis.

When light is incident upon the primary first prism block A1, it is the extraordinary light because the direction of vibration and the optical axis of the first polarized light are parallel. However, when the light is input to the second prism block A2 beyond the junction plane of these blocks, the direction of vibration and the optical axis of the first polarized light are perpendicular, and the light is propagated as ordinary light.

On the other hand, when light is incident upon the primary first prism block A1, it is ordinary light because the direction of vibration and the optical axis of the second polarized light are perpendicular. However, when the light is input to the second prism block A2 beyond the junction plane of these blocks, the direction of vibration and the optical axis of the second polarized light are parallel, and the light is propagated as extraordinary light.

When the input light travels beyond the junction plane inside the polarizing beam splitter A, if the prism blocks constituting this are set to make a refractive index for ordinary light greater than a refractive index for extraordinary light, the ordinary light is bent in a direction in which it moves toward a normal of the junction plane, and the extraordinary light is bent in a direction in which it moves away from the normal of the junction plane. In this way, the rays of input light having the same wavelength are split by the polarizing beam splitter A so as to travel in other directions according to the orientations of polarization.

A deflected amount of the light in the traveling direction in the polarizing beam splitter A depends on (1) an angle $\theta$ formed between the junction plane of the first prism block A1 and the second prism block A2 and an XY plane within a YZ plane, (2) materials of the first prism block A1 and the second prism block A2, and (3) directions of the optical axes of the first and second prism blocks A1 and A2.

In the present example, θ is 60°, and the materials of the first and second prism blocks are quartz. A light incoming plane (an XY plane) of the first prism block A1 is a (11$\bar{2}$0) plane, and a light outgoing plane (an XY plane) of the second prism block A2 is a plane that faces the (11$\bar{2}$0) plane. When a material of the Wollaston prism is a trigonal crystal such as quartz, sapphire, etc., for example the incoming plane is defined as a plane parallel to the XY plane. When a prism having a c axis parallel to the Y axis and a prism having a c axis parallel to the X axis is joined as described above, polarization splitting is possible.

Light incoming and outgoing planes of the polarizing beam splitter A are both parallel to the XY plane, and this light outgoing plane and a light incoming plane of the diffractive optical element B of the subsequent stage are joined. These may be physically in contact with each other or may be separated from each other.

Next, the diffractive optical element B will be described.

Figure 4:
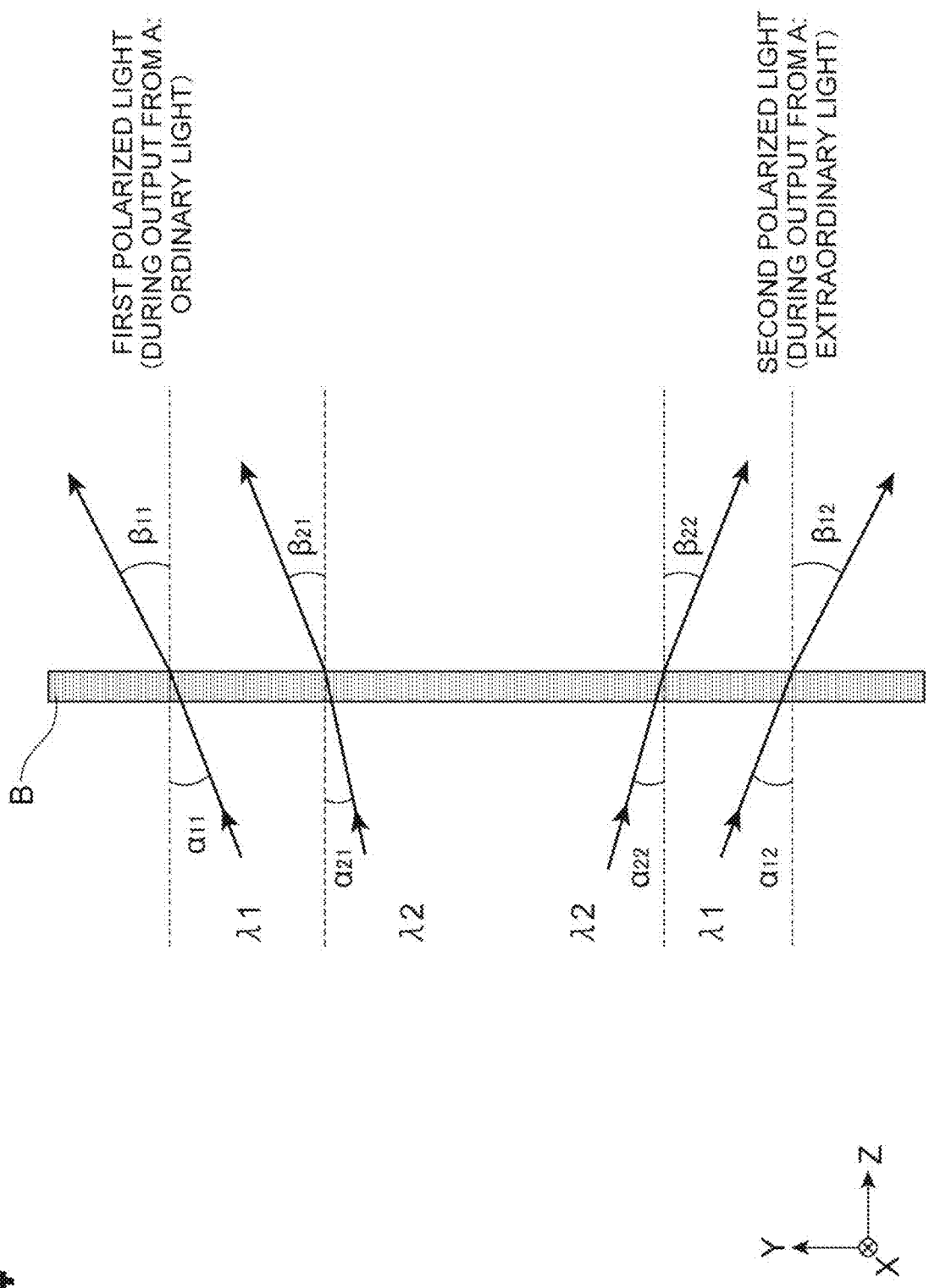
FIG. 4 is a diagram illustrating diffraction caused by a diffraction grating.

FIG. 4 is a diagram illustrating diffraction caused by a diffraction grating.

The light transmission regions of the diffractive optical element B constitute a single pattern (see FIGS. 5A and 5B).

All of the first polarized light of the first input light (of the first wavelength λ1), the first polarized light of the second input light (of the second wavelength λ2), the second polarized light of the first input light (of the first wavelength λ1), and the second polarized light of the second input light (of the second wavelength λ2) are arranged to be incident upon the single pattern of the diffractive optical element B. The first wavelength λ1 is for the terahertz wave, and the second wavelength λ2 is for the visible light. Thus, λ2<λ1.

As illustrated in FIG. 5B, a pitch t of the single pattern is defined by a distance between middle positions of the light transmission regions R in a direction of the Y axis.

As in FIG. 4, incoming and outgoing angles of the light of each wavelength are set.

In this case, an incoming angle $α_{11}$ and an outgoing angle $α_{11}$ of the first polarized light of the first input light (of the first wavelength λ1) for the diffractive optical element B, an incoming angle $α_{12}$ and an outgoing angle $β_{12}$ of the second polarized light of the first input light (of the first wavelength λ1) for the diffractive optical element B, an incoming angle $α_{21}$ and an outgoing angle $β_{21}$ of the first polarized light of the second input light (of the second wavelength λ2) for the diffractive optical element B, and an incoming angle $α_{22}$ and an outgoing angle $β_{22}$ of the second polarized light of the second input light (of the second wavelength λ2) for the diffractive optical element B satisfy these relational formulae when $m_{11}$, $m_{12}$, $m_{21}$, and $m_{22}$ are set to arbitrary natural numbers.

$|\sin α_{11} - \sin β_{11}| \neq m_{11} λ1/t$ $|\sin α_{12} - \sin β_{12}| \neq m_{12} λ1/t$ $|\sin α_{21} - \sin β_{21}| = m_{21} λ2/t$ $|\sin α_{22} - \sin β_{22}| = m_{22} λ2/t$ In the example, the first wavelength λ1 does not satisfy diffraction conditions and thus is not deflected, and the second wavelength λ2 satisfies the diffraction conditions and thus is deflected. The traveling directions of the rays of first polarized light having different wavelengths can be made to coincide with each other, and the traveling directions of the rays of second polarized light having different wavelengths can be made to coincide with each other. That is, $β_{11}=β_{21}$, and $β_{12}=β_{22}$. When the light of the wavelength λ is input to the diffractive optical element at an incoming angle α and an outgoing angle β, and m is set to a natural number, $|\sin α - \sin β|=mλ/t$ is the diffraction conditions on which the light is reinforced with respect to a pitch t.

FIG. 5A is a plan diagram of the diffractive optical element B (the diffraction grating), and FIG. 5B is a diagram illustrating a cross-sectional configuration in which the diffraction grating is cut along arrow Y-Y.

This diffraction grating includes a plurality of light transmission regions R that extend in a direction of the X axis. The plurality of light transmission regions R constitute stripes. A region between the light transmission regions R becomes a concavity. In the diffraction grating, light diffusion processing such as roughening is performed in the concavity, or a light blocking region is formed by disposing a lightproof material S in the concavity as illustrated in FIG. 5B. The light mentioned here is a terahertz wave and visible light. In the diffraction grating, a bright fringe is generated when an optical path difference between neighboring light transmission regions R (slits) becomes an exact integer multiple of the wavelength, and a dark fringe is generated when the optical path difference has half the wavelength added to an integer multiple of the wavelength.

Figure 6:
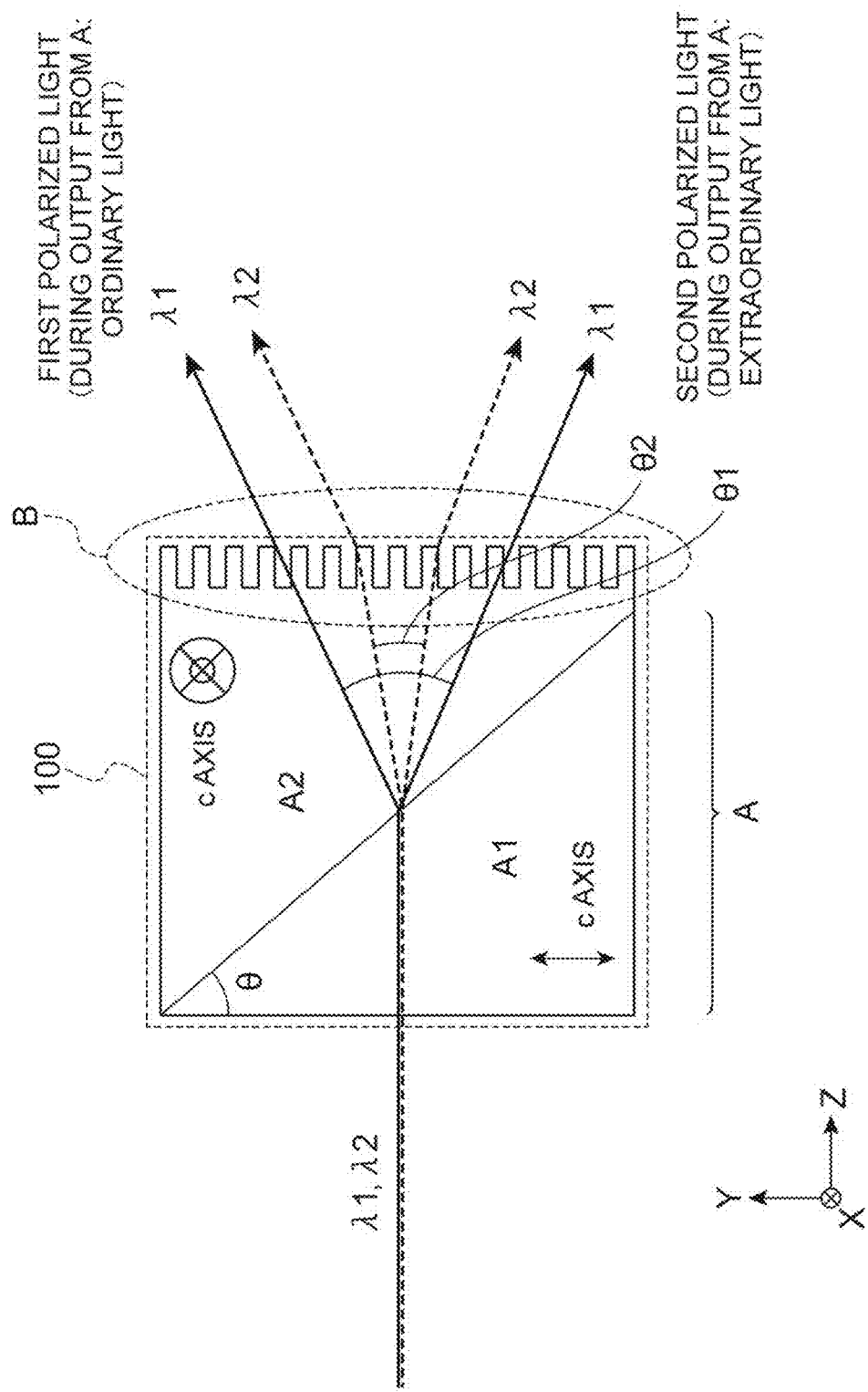
FIG. 6 is a diagram illustrating an optical structure according to an embodiment.

FIG. 6 is a diagram illustrating an optical structure according to a second embodiment.

In this optical structure 100, the polarizing beam splitter A and the diffractive optical element B are integrated without a junction plane. The optical structure 100 of FIG. 6 is different from that illustrated in FIG. 3 only in this respect, and is the same in other respects.

In the case of this configuration, there are effects that it is not necessary to adhere the diffractive optical element B to the Wollaston prism, an angle deviation at the time of adhesion between the diffractive optical element and the polarizing beam splitter is minimized, and a loss of light or the like resulting from a refractive index difference between an adhesive and a member is minimized. The diffractive optical element B is a diffraction grating, and a structure thereof is as described above.

Figure 7:
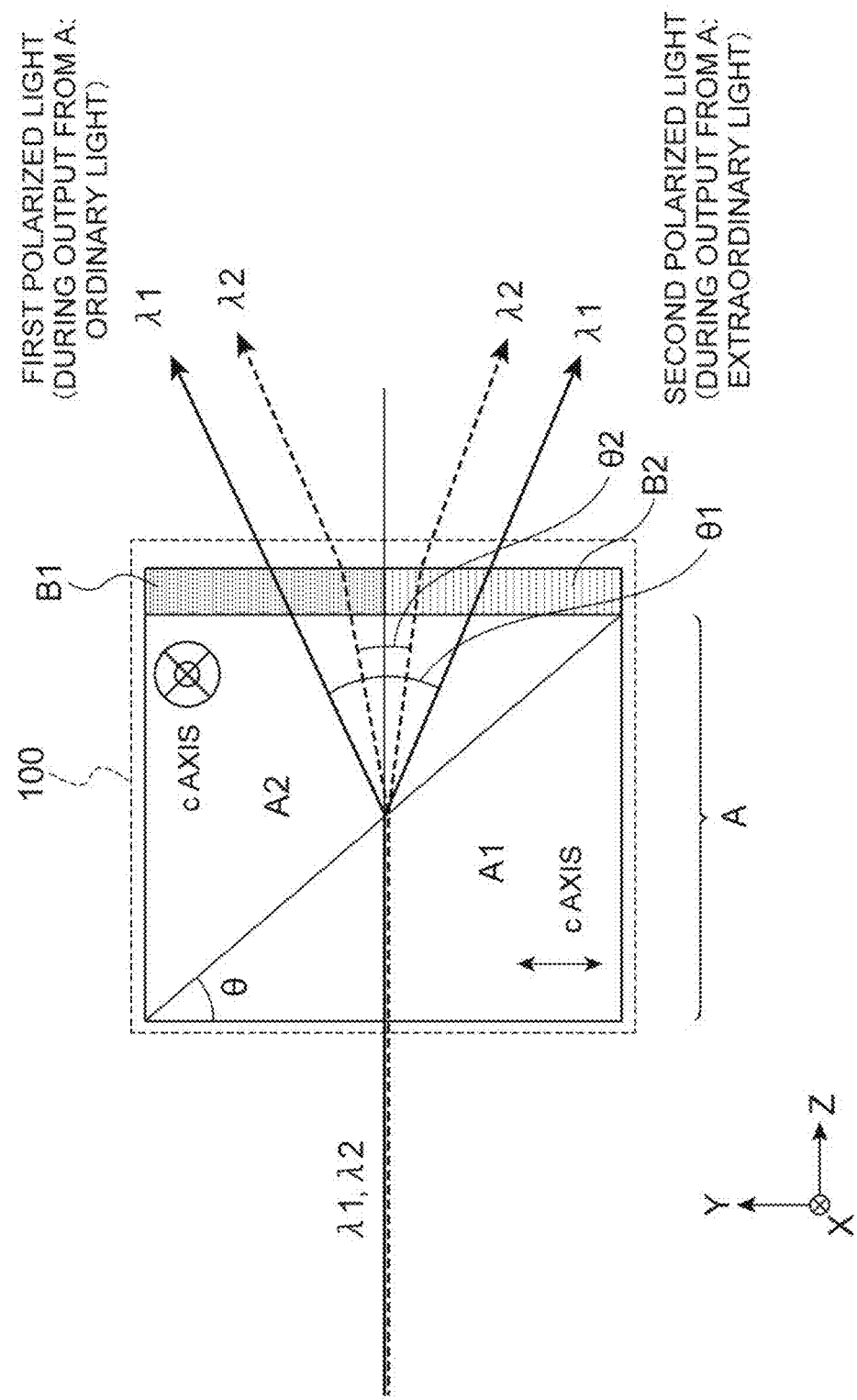
FIG. 7 is a diagram illustrating an optical structure according to an embodiment.

FIG. 7 is a diagram illustrating an optical structure according to a third embodiment.

This optical structure 100 includes first diffractive optical element B1 and second diffractive optical element B2. In the case of the present example, a structure of each diffractive optical element is identical to those illustrated in FIGS. 5A and 5B. To be specific, the diffractive optical element B includes the first diffractive optical element B1 having a first pattern made up of some of the plurality of light transmission regions R, and the second diffractive optical element having a second pattern made up of the others of the plurality of light transmission regions. The first diffractive optical element B1 and the second diffractive optical element B2 may be in contact with each other, be separated from each other, or form both the patterns with the same member.

The first polarized light of the first input light (of the first wavelength λ1) and the first polarized light of the second input light (of the second wavelength λ2) are designed to be incident upon the first diffractive optical element B1. The second polarized light of the first input light (of the first wavelength λ1) and the second polarized light of the second input light (of the second wavelength λ2) are designed to be incident upon the second diffractive optical element B2.

According to a pitch t1 of the first pattern of the first diffractive optical element B1 and a pitch t2 of the second pattern of the second diffractive optical element, a degree of deflection of light is independently changed. The pitch t1 and the pitch t2 correspond to tin FIG. 5B. As illustrated in FIG. 5B, the pitch of each pattern is defined by the distance between middle positions of the light transmission regions R in the direction of the Y axis.

Figure 8:
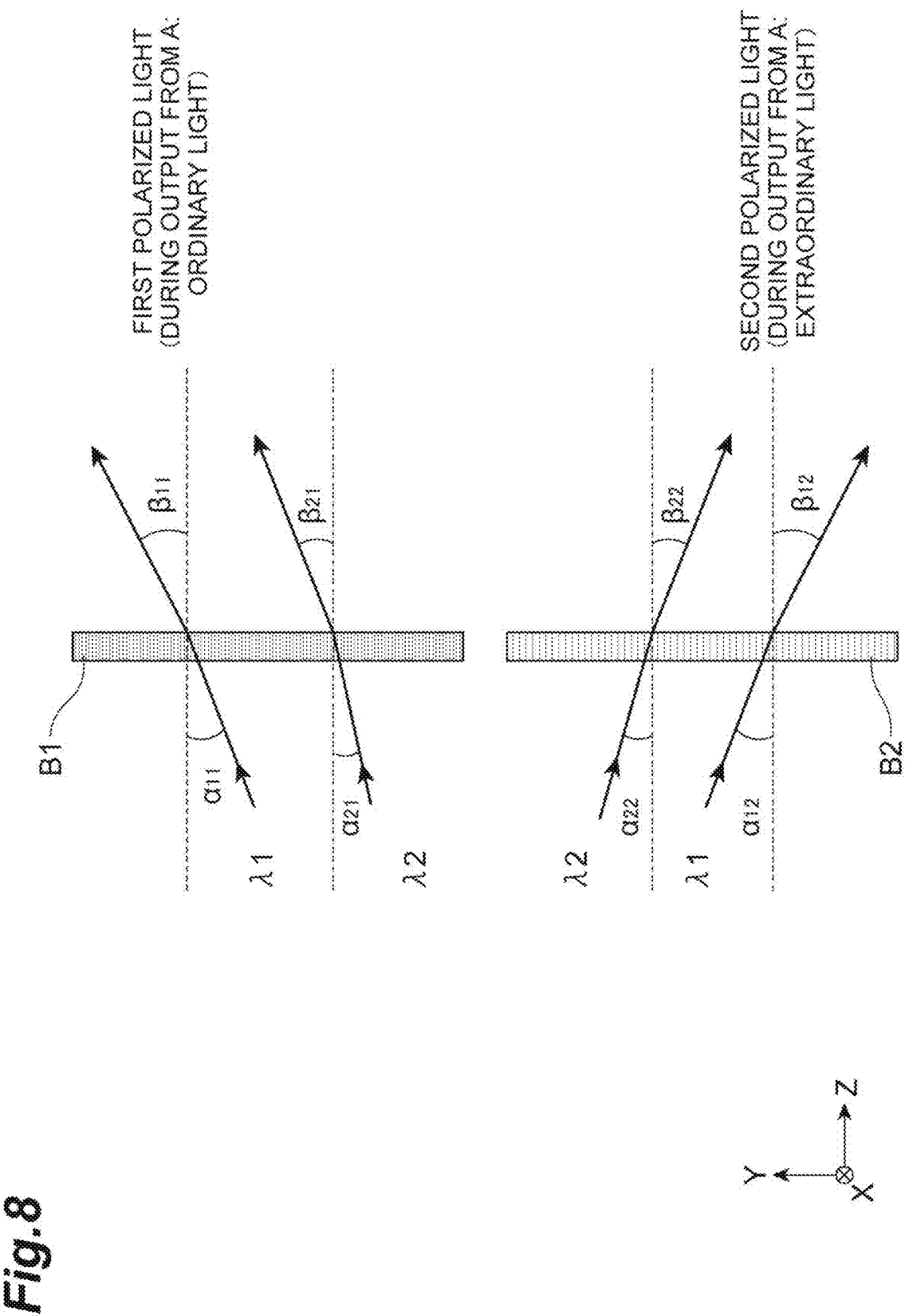
FIG. 8 is a diagram illustrating diffraction from a diffraction grating.

FIG. 8 is a diagram illustrating diffraction caused by a diffraction grating. As in FIG. 8, incoming and outgoing angles of light of each wavelength are set.

An incoming angle $\alpha_{11}$ and an outgoing angle $\beta_{11}$ of the first polarized light of the first input light (of the first wavelength $\lambda 1$) for the first diffractive optical element B1, an incoming angle $\alpha_{12}$ and outgoing angle $\beta_{12}$ of the second polarized light of the first input light (of the first wavelength $\lambda 1$) for the second diffractive optical element B2, an incoming angle $\alpha_{21}$ and an outgoing angle $\beta_{21}$ of the first polarized light of the second input light (of the second wavelength $\lambda 2$) for the first diffractive optical element B1, and an incoming angle $\alpha_{22}$ and an outgoing angle $\beta_{22}$ of the second polarized light of the second input light (of the second wavelength $\lambda 2$) for the second diffractive optical element B2 satisfy the following relational formulae when $m_{21}$ and $m_{22}$ are set to arbitrary natural numbers.

$$t1 \neq t2$$

$$|\sin \alpha_{21} - \sin \beta_{21}| = m_{21} \lambda 2 / t1$$

$$|\sin \alpha_{22} - \sin \beta^{22}| = m_{22} \lambda 2 / t2$$

In this case, since the first polarized light and the second polarized light of the second wavelength $\lambda 2$ of the second input light are input to different diffraction gratings, they can be controlled with different diffraction conditions, an angle of deflection due to the diffraction can be adjusted easily, and coincidence of the traveling direction with the first input light can be achieved easily. In the case of this structure, the first input light may be diffracted and deflected.

Figure 9:
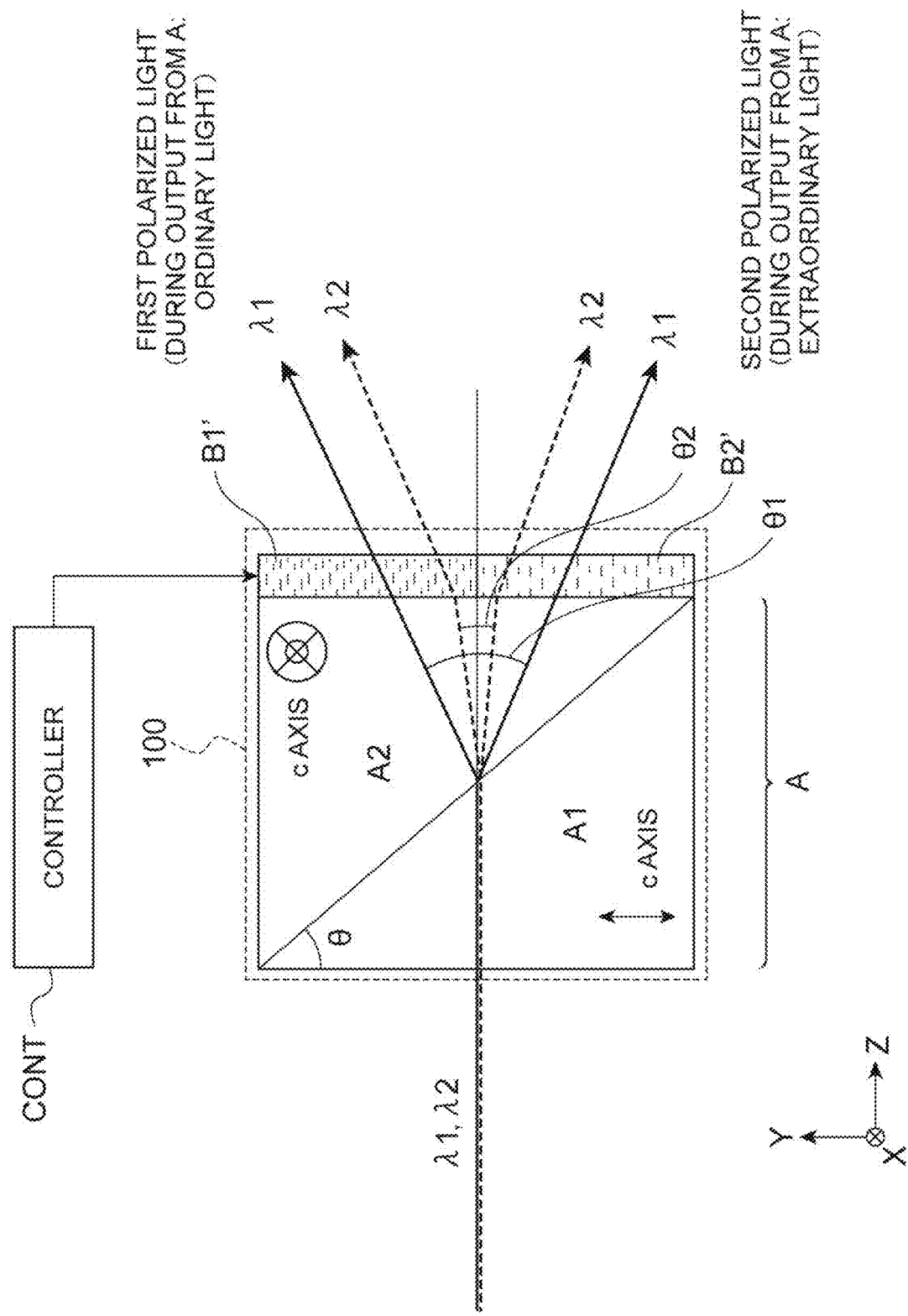
FIG. 9 is a diagram illustrating an optical structure according to an embodiment.

FIG. 9 is a diagram illustrating an optical structure according to a fourth embodiment.

In this optical structure 100, the structures of the first and second diffractive optical element B1 and B2 of FIG. 7 are used as first and second spatial light modulators B1' and B2', and the other structures and operation and effects are identical to those illustrated in FIG. 9. These spatial light modulators are different from the first and second diffractive optical element B1 and B2 of FIG. 7 in that the light transmission regions can be formed by a control signal input from a controller CONT.

As an example, the spatial light modulators are modulators in which transparent electrodes are provided on both surfaces of a liquid crystal layer and outsides thereof are sandwiched between a pair of $\lambda/4$ sheets. Transmission characteristics of light that can be transmitted through the $\lambda/4$ sheets are changed by a voltage (a control signal) applied to the liquid crystal layer via the transparent electrodes.

In the spatial light modulators, since various light transmission patterns can be formed, fine adjustment of a diffracted state can be performed while monitoring a state of output light, and different deflections can also performed by forming different patterns.

As described above, the diffractive optical element can be used as the diffraction grating or the spatial light modulator. Since the diffraction grating is an easily available component, production is simple. Since the spatial light modulator.

can form a desired diffraction pattern according to an input signal, desired deflection can be performed.

The diffractive optical element may be used as the spatial light modulator, and thereby a diffraction angle and diffraction efficiency can be adjusted. At this time, the first spatial light modulator. B1' and the second spatial light modulator. B2' are different in orientation of a liquid crystal, and each can be divided into a region in which a polarizing direction of a ray of ordinary light and a direction of the liquid crystal coincide with each other and a region in which a polarizing direction of a ray of extraordinary light and the direction of the liquid crystal coincide with each other. A polarization component passes through each region, and thereby the polarized light can also diffracted without changing a polarized state before and after input and output.

Figure 10:
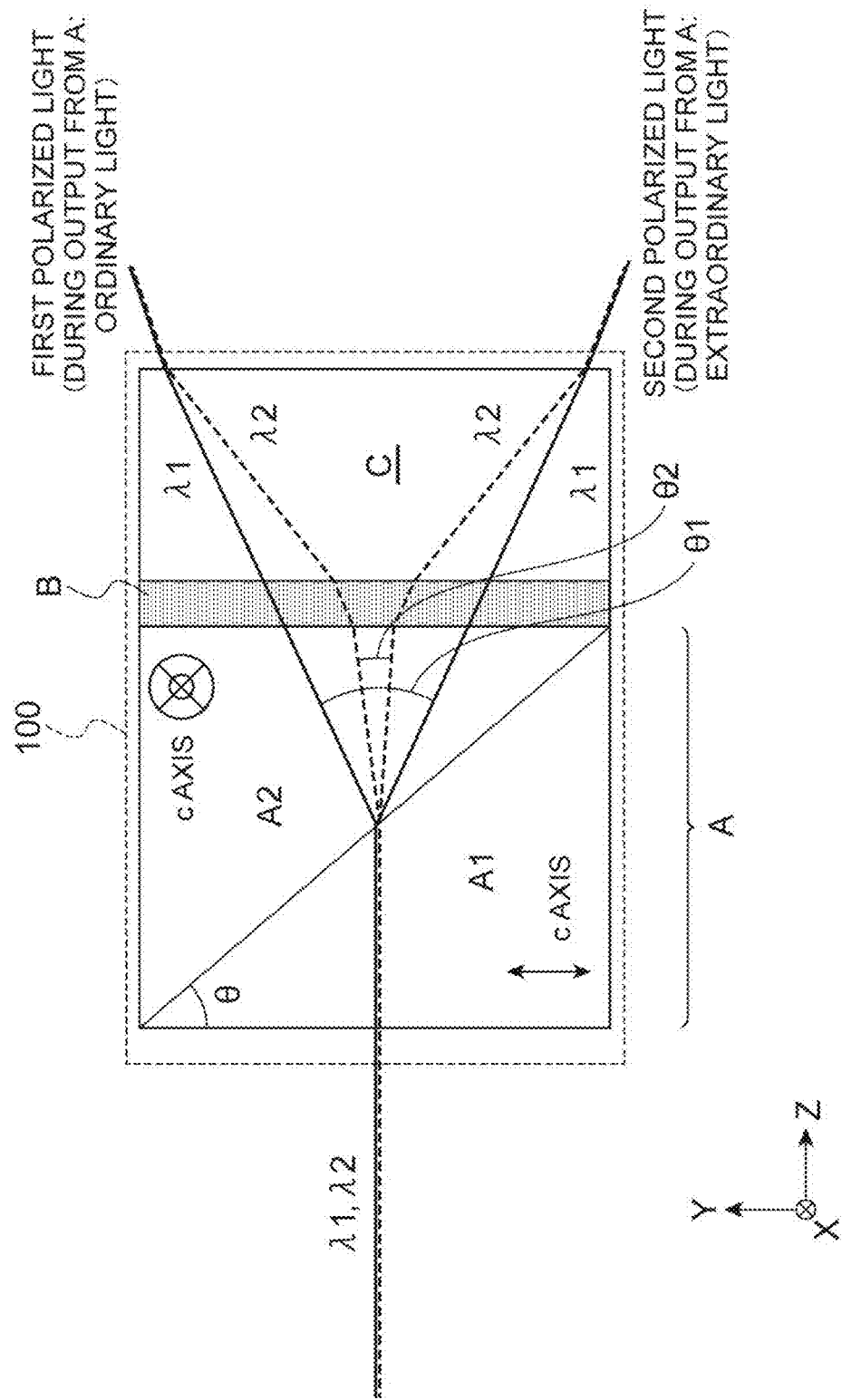
FIG. 10 is a diagram illustrating an optical structure according to an embodiment.

FIG. 10 is a diagram illustrating an optical structure according to a fifth embodiment.

This optical structure 100 has an outgoing position compensator C additionally disposed at a stage subsequent to the diffractive optical element in any of the above optical structures, and the configuration is otherwise identical to the above configurations.

The outgoing position compensator C of this example is made up of a block formed of a homogeneous single material. This block may have a shape such as a columnar shape whose central axis is the Z axis, a prismatic shape, a cuboidal shape, a tabular shape, or the like. In one example, the block is used as a block formed of a cuboidal dielectric, and the light incoming plane and the light outgoing plane are together adapted to be parallel to the XY plane. As permittivity becomes high, the refractive index becomes high. Thus, the prism block and the outgoing position compensator using a refractive action are all formed of a dielectric material (an insulator).

Figure 11:
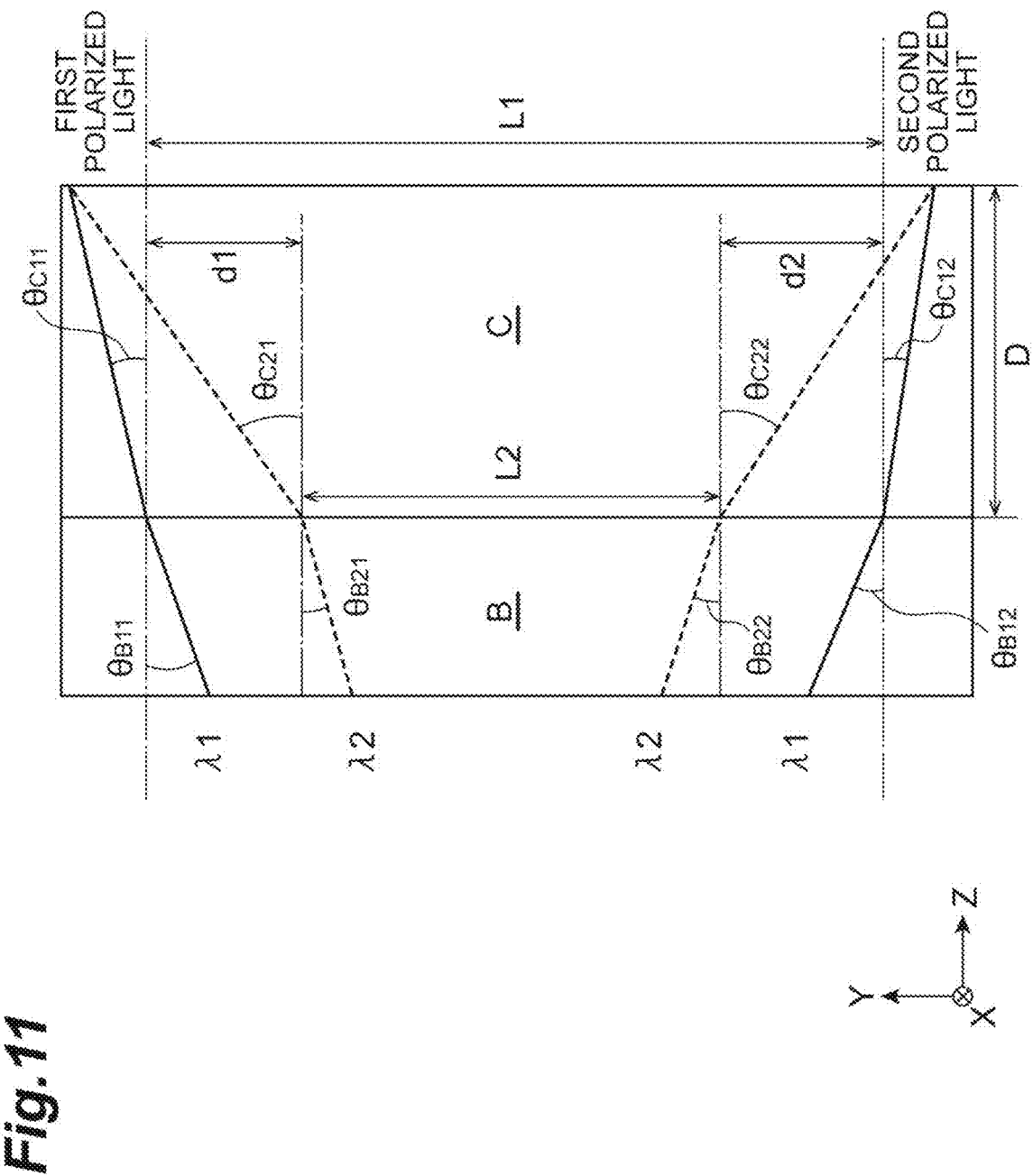
FIG. 11 is a diagram illustrating a configuration around an outgoing position compensator of the optical structure according to the embodiment.

The outgoing position compensator C corrects a position and traveling direction of the first polarized light, which is separated and output by the distance d1, on the output plane of the diffractive optical element B of the previous stage, and simultaneously corrects a position and traveling direction of the second polarized light, which is separated and output by the distance d2 (see FIG. 11).

Therefore, the light outgoing position and traveling direction of the first polarized light of the first input light can be made to coincide with those of the first polarized light of the second input light, and the light outgoing position and traveling direction of the second polarized light of the first input light can be made to coincide with those of the second polarized light of the second input light.

When the outgoing position compensator C is formed of a birefringent material, in the case of a uniaxial crystal, it is preferable to use an outgoing position compensator C in which an optical axis is parallel to the Z axis, but in the case of a biaxial crystal, while the outgoing position compensator C may be formed of a birefringent material, the outgoing position compensator C undergoes occurrence of birefringence despite coincidence of optical axes, making design difficult.

The outgoing position compensator C can also be formed of a material in which a refractive index within an entire volume is uniform rather than a birefringent material.

In the present example, since the diffractive optical element B for compensating for the split angles and the outgoing position compensator C are provided, positional correction caused by an alignment compensator having these is made easy. The alignment compensator is optical path correcting means using the fact that different wavelengths pass through different traveling paths. In a case in which rays of light of different wavelengths are input to different positions in different traveling directions, the optical path correcting means makes the outgoing positions and the traveling directions coincide with each other on the light outgoing plane for the rays of light. If one of the wavelengths is set for invisible light (a terahertz wave), and the other wavelength located in a band discontinuous to this is set for visible light (monitoring light), the invisible light and the visible light that are input to the polarizing beam splitter on the same axis appear at the same position on the light outgoing plane of the alignment compensator, and travel in the same direction. Therefore, the position of the visible light is monitored, and thereby the position of the invisible light can be more accurately monitored.

FIG. 11 is an enlarged diagram illustrating the diffractive optical element B and the outgoing position compensator C illustrated in FIG. 10.

The first polarized light of the first input light (of the first wavelength λ1) is deflected and travels at a split angle $\theta_{B11}$ (i.e., an incident angle upon the outgoing position compensator C) from the Z axis in the diffractive optical element B. The first polarized light of the second input light (of the second wavelength λ2) is deflected and travels at a split angle $\theta_{B21}$ (i.e., an incident angle upon the outgoing position compensator C) from the Z axis in the diffractive optical element B.

The second polarized light of the first input light (of the first wavelength λ1) is deflected and travels at a split angle $\theta_{B12}$ (i.e., an incident angle upon the outgoing position compensator C) from the Z axis in the diffractive optical element B. The second polarized light of the second input light (of the second wavelength λ2) is deflected and travels at a split angle $\theta_{B22}$ (i.e., an incident angle upon the outgoing position compensator C) from the Z axis in the diffractive optical element B.

Since the light incoming plane of the outgoing position compensator C is parallel to the XY plane, a normal thereof is parallel to the Z axis. Therefore, the split angles from the Z axis coincide with incoming angles of the rays of light toward the outgoing position compensator C.

Thereby, the first polarized light of the first input light and the first polarized light of the second input light separated by the distance d1 are emitted from the same position on the light outgoing plane of the outgoing position compensator C. Air is outside of the outgoing position compensator C, and the first polarized light of the first input light and the first polarized light of the second input light travel in the same direction due to a refractive index difference between the outgoing position compensator C and the air.

The first polarized light of the first input light (of the first wavelength λ1) is refracted and travels at an outgoing angle $\theta_{C11}$ (i.e., a split angle from the Z axis) on the junction plane (the XY plane) between the diffractive optical element B and the outgoing position compensator C. The first polarized light of the second input light (of the second wavelength λ2) is refracted and travels at an outgoing angle $\theta_{C21}$ (i.e., a split angle from the Z axis) on the junction plane (the XY plane) between the diffractive optical element B and the outgoing position compensator C.

The second polarized light of the first input light (of the first wavelength λ1 is refracted and travels at an outgoing angle $\theta_{C12}$ (i.e., a split angle from the Z axis) on the junction plane (the XY plane) between the diffractive optical element B and the outgoing position compensator C. The second polarized light of the second input light (of the second wavelength λ2) is refracted and travels at an outgoing angle $\theta_{C22}$ (i.e., a split angle from the Z axis) on the junction plane (the XY plane) between the diffractive optical element B and the outgoing position compensator C.

Thereby, the second polarized light of the first input light and the second polarized light of the second input light separated by the distance d2 are emitted from the same position on the light outgoing plane of the outgoing position compensator C. Air is outside the outgoing position compensator C, and the second polarized light of the first input light and the second polarized light of the second input light travel in the same direction due to a refractive index difference between the outgoing position compensator C and the air.

As illustrated in FIG. 3, the polarizing beam splitter A splits the input light, which is input from the incoming plane, into the first polarized light (ordinary light when output from the polarizing beam splitter) and the second polarized light (extraordinary light when output from the polarizing beam splitter). The split angles (the first split angle θ1 of the first wavelength λ1 and the second split angle θ2 of the second wavelength λ2) formed by the traveling directions of the rays of first polarized light and by the traveling directions of the rays of second polarized light in the polarizing beam splitter A are acute angles. In the diffractive optical element B, in order to cause the positions and the directions of the rays of output light to coincide with each other, the deflected angles caused by the diffractive optical element B satisfy θ2-θ1>θ2'-θ', and a difference between the split angles is reduced before and after the input. The first wavelength λ1 is longer than the second wavelength λ2, and θ1 is greater than θ2. The parameters such as θ1', θ2', etc. (see FIG. 3) are as follows.

θ1: The split angle when the first input light is input to the polarizing beam splitter A θ2: The split angle when the second input light is input to the polarizing beam splitter A θ1' ($=\theta_{B11}+\theta_{B12}$): The split angle in the diffractive optical element B when the first polarized light and the second polarized light originating from the first input light (of the first wavelength λ1) are input to the diffractive optical element B θ2' ($=\theta_{B21}+\theta_{B22}$): The split angle in the diffractive optical element B when the first polarized light and the second polarized light originating from the second input light (of the second wavelength λ2) are input to the diffractive optical element B The light outgoing plane of the diffractive optical element B has the following parameters.

$n_{B1P}$: The refractive index for the first polarized light of the first wavelength λ1

$n_{B1S}$: The refractive index for the second polarized light of the first wavelength λ1

$n_{B2P}$: The refractive index for the first polarized light of the second wavelength λ2

$n_{B2S}$: The refractive index for the second polarized light of the second wavelength λ2

L1: The separation distance between the first polarized light and the second polarized light originating from the first input light (of the first wavelength λ1) on the light outgoing plane of the diffractive optical element B L2: The separation distance between the first polarized light and the second polarized light originating from the second input light (of the second wavelength λ2) on the light outgoing plane of the diffractive optical element B In addition, the outgoing position compensator C has the following parameters.

$n_{C1}$: The refractive index at the first wavelength λ1

$n_{C2}$: The refractive index at the second wavelength λ2

D: The thickness (in the direction of the Z axis)

To cause deviation amounts of the distance d1 to coincide with each other in the outgoing position compensator C, d1 satisfies the following formula.

$$d1(D \cdot \tan\theta_{C21} - D \cdot \tan\theta_{C11})$$

$\theta_{C11}$ and $\theta_{C21}$ satisfy the following formulae.

$$\theta_{C11} = \sin^{-1}((n_{B1P} \cdot \sin\theta_{B11})/n_{C1})$$

$$\theta_{C21} = \sin^{-1}((n_{B2P} \cdot \sin\theta_{B21})/n_{C2})$$

Likewise, to cause deviation amounts of the distance d2 to coincide with each other in the outgoing position compensator C, d2 satisfies the following formula.

$$d2 = (D \cdot \tan\theta_{C22} - D \cdot \tan\theta_{C11})$$

$\theta_{C12}$ and $\theta_{C22}$ satisfy the following formulae.

$$\theta_{C12} = \sin^{-1}((n_{B1S} \cdot \sin\theta_{B12})/n_{C1})$$

$$\theta_{C22} = \sin^{-1}((n_{B2S} \cdot \sin\theta_{B22})/n_{C2})$$

As described above, to cause the positions and directions of the rays of outgoing light to coincide with each other, the refractive index $n_{B1S}$, the refractive index $n_{B1P}$, the refractive index $n_{B2S}$, the refractive index $n_{B2P}$, the separation distance L1, the separation distance L2, the refractive index $n_{C1}$, the refractive index $n_{C2}$, and the thickness D satisfy the following relational formula.

$$L1 - L2 = (D \cdot \tan\theta_{C21} - D \cdot \tan\theta_{C11}) + (D \cdot \tan\theta_{C22} - D \cdot \tan\theta_{C12})$$

$\theta_{C11}$, $\theta_{C21}$, $\theta_{C12}$, and $\theta_{C22}$ satisfy the following formulae.

$$\theta_{C11} = \sin^{-1}((n_{B1P} \cdot \sin\theta_{B11})/n_{C1})$$

$$\theta_{C21} = \sin^{-1}((n_{B2P} \cdot \sin\theta_{B21})/n_{C2})$$

$$\theta_{C12} = \sin^{-1}((n_{B1S} \cdot \sin\theta_{B12})/n_{C1})$$

$$\theta^{C22} = \sin^{-1}((n_{B2S} \cdot \sin\theta_{B22})/n_{C2})$$

As described above, the deflected amounts (the split angles) of the light in the traveling directions in the polarizing beam splitter A depend on: (1) an angle θ at which the junction plane between the first prism block A1 and the second prism block A2 is formed with respect to the XY plane within the YZ plane; (2) materials (refractive indices) of the first and second prism blocks A1 and A2; and (3) directions of the optical axes of the first and second prism blocks A1 and A2.

When the directions of the optical axes are as described above, a material of the polarizing beam splitter A is quartz, the diffractive optical element B is a diffraction grating and a material thereof is quartz, the pitch t is 30 μm, the first wavelength is 300 μm, and the second wavelength is 633 nm, the first polarized light and the second polarized light satisfy the following relational formula in order to travel nearly in the same direction with the separation of the above distances L1 and L2.

$$L1 - L2 = (D \cdot \tan\theta_{C21} - D \cdot \tan\theta_{C11}) + (D \cdot \tan\theta_{C22} - D \cdot \tan\theta_{C12})$$

$\theta_{C11}$, $\theta_{C21}$, $\theta_{C12}$, and $\theta_{C22}$ satisfy the following formulae.

$$\theta_{C11} = \sin^{-1}((n_{B1P} \cdot \sin\theta_{B11})/n_{C1})$$

$$\theta^{C21} = \sin^{-1}((n_{B2P} \cdot \sin\theta_{B21})/n_{C2})$$

$$\theta_{C12} = \sin^{-1}((n_{B1S} \cdot \sin\theta_{B12})/n_{C1})$$

$$\theta_{C22} = \sin^{-1}((n_{B2S} \cdot \sin\theta_{B22})/n_{C2})$$

In the above optical structures, the polarizing beam splitter A and the diffractive optical element B are each made up of a Wollaston prism. In the case of these structures, since the Wollaston prism is easily available on the market, there is an advantage that assembly is made easy.

Figure 12:
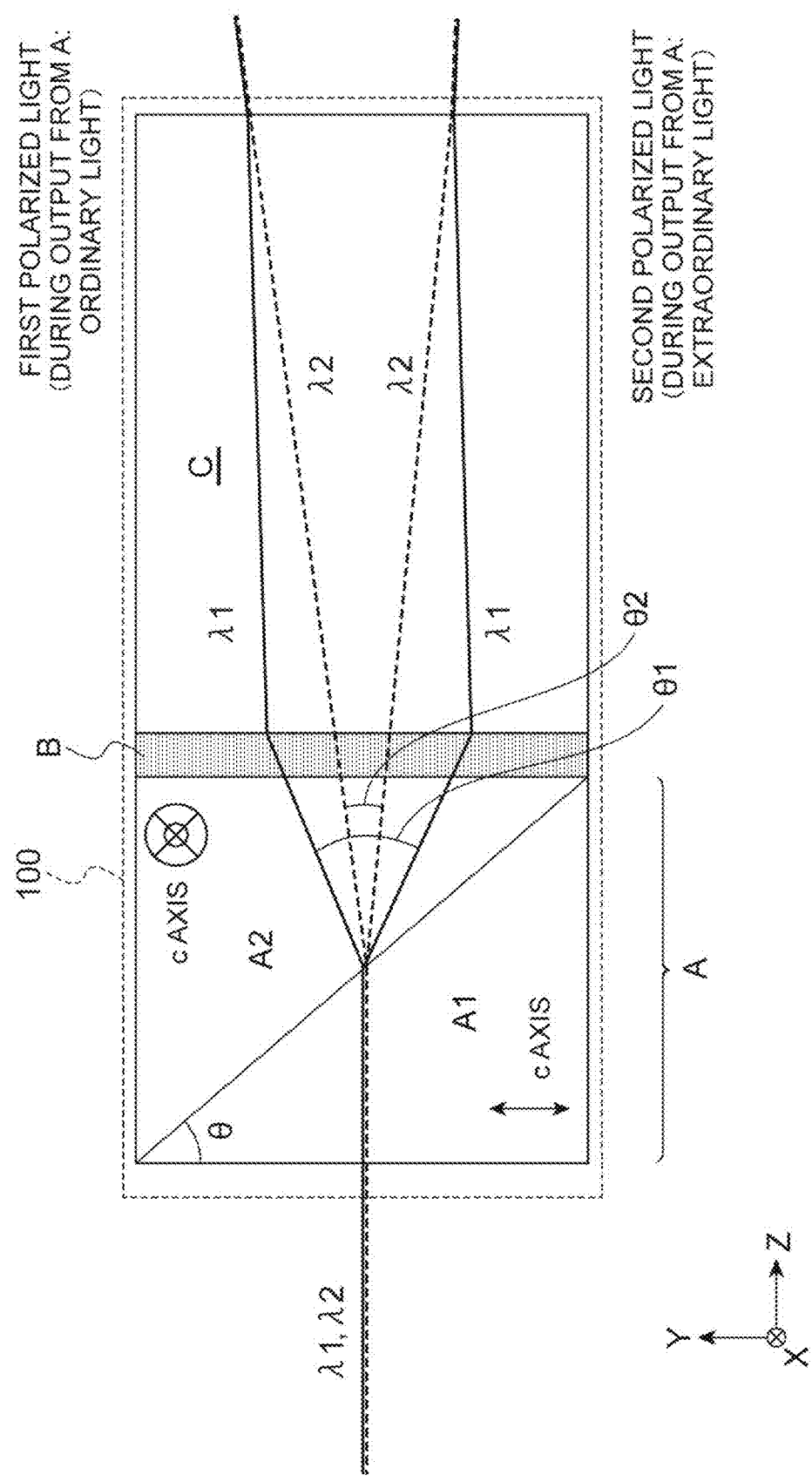
FIG. 12 is a diagram illustrating an optical structure according to an embodiment.

FIG. 12 is a diagram illustrating an optical structure according to an embodiment.

In the present example, a length of the outgoing position compensator C in the direction of the Z axis is increased. In the above, after the second input light is deflected such that the split angle thereof is extended in the diffractive optical element B, the outgoing position thereof is corrected by the outgoing position compensator C. However, the present example is configured in that the first input light is deflected such that the split angle thereof is contracted in the diffractive optical element B, and the outgoing position thereof is corrected by the outgoing position compensator C. In this configuration, the directions and the positions of the rays of outgoing light of each polarized light can coincide with each other.

In FIGS. 5A and 5B above, the diffraction grating having a striped pattern is illustrated as the diffractive optical element B, but the other patterns may be used.

Figure 13A:
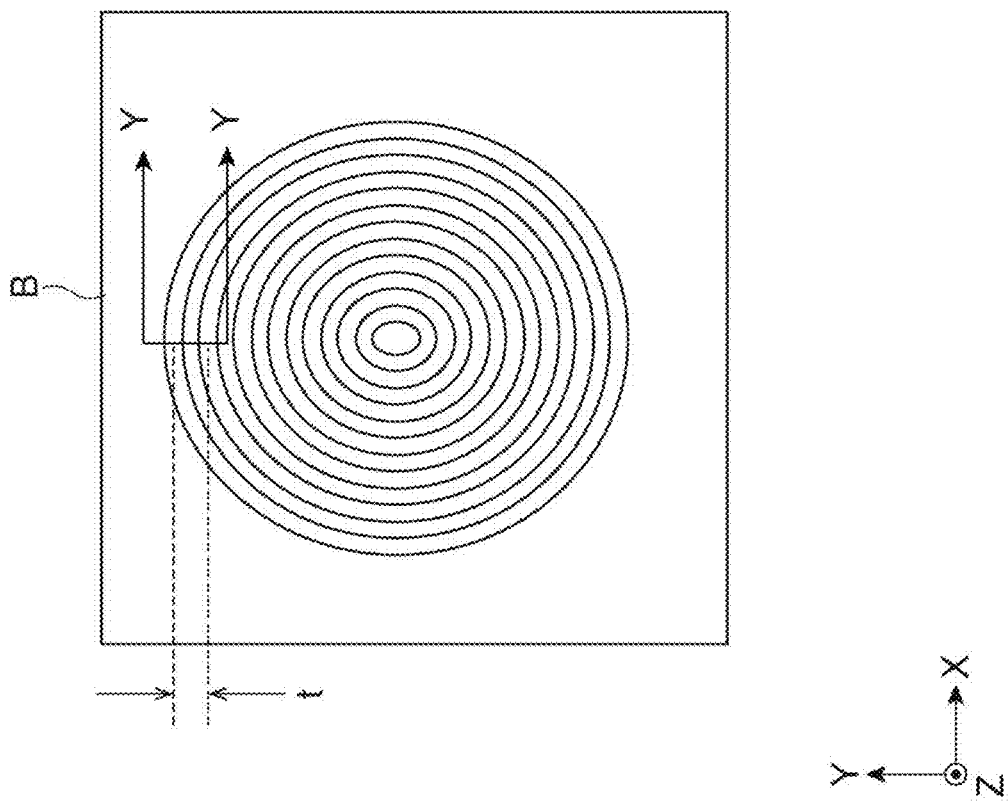
FIG. 13A is a plan diagram of another diffraction grating.
Figure 13B:
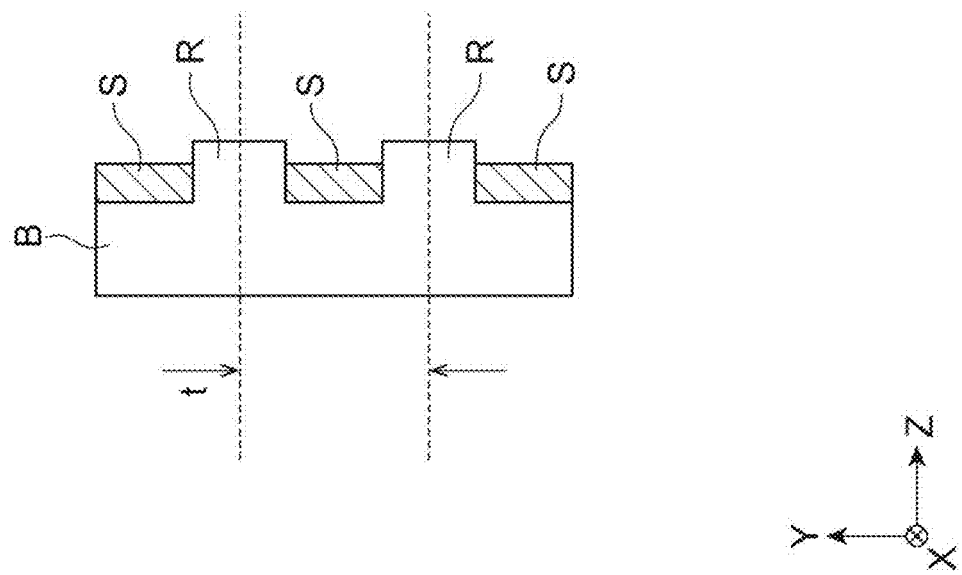
FIG. 13B is a diagram illustrating a cross-sectional configuration of the diffraction grating.

FIG. 13A is a plan diagram of another diffraction grating, and FIG. 13B is a diagram illustrating a cross-sectional configuration of the diffraction grating which is cut by arrow Y-Y.

This diffraction grating includes a plurality of light transmission regions R having an annular shape centered on the Z axis. The plurality of light transmission regions R constitute a group of concentric circles. A region between the light transmission regions R becomes a concavity. In the diffraction grating, light diffusion processing such as roughening is performed in the concavity, or a light blocking region is formed by disposing a lightproof material S in the concavity as illustrated in FIG. 13B. The light mentioned here is a terahertz wave and visible light and may be applied to this diffraction grating.

An optical coupling agent may be used for adhesion when the Wollaston prism and the diffraction grating are brought into contact to minimize a loss caused by a refractive index difference.

A wave of a wavelength of 300 μm (1 THz) as the terahertz wave and light of a wavelength of 633 nm as the visible light may be illustratively used. In the above, the number of wavelengths of the input light is set to two, but may be two or more.

A material of the Wollaston prism needs to be a uniaxial or biaxial crystal, or another material having birefringence. For example, quartz, $MgF_2$, KDP, KTP, $LiNbO_3$, $LiTaO_3$, $KNbO_3$, sapphire, LBO, CLBO, $AgGaS_2$, $AgGaSe_2$, ZGP, GaN, BBO, $TiO_2$, calcite, polycarbonate, or the like may be applied.

As a material of the diffraction grating, quartz, sapphire, $MgF_2$, KDP, KTP, $LiNbO_3$, $LiTaO_3$, $KNbO_3$, LBO, CLBO, $AgGaS_2$, $AgGaSe_2$, ZGP, GaN, BBO, $TiO_2$, calcite, acrylic, a cycloolefin polymer, polycarbonate, silicon, germanium, MgO, or the like may be applied.

A material of the outgoing position compensator C is not limited to a uniaxial crystal or a biaxial crystal, and may be amorphous in addition to other crystals having isotropy or the like. Therefore, as the material of the outgoing position compensator C, quartz, sapphire, $MgF_2$, KIP, KTP, $LiNbO_3$, $LiTaO_3$, $KNbO_3$, LBO, CLBO, $AgGaS_2$, $AgGaSe_2$, ZGP, GaN, BBO, $TiO_2$, calcite, acrylic, a cycloolefin polymer, polycarbonate, silicon, germanium, MgO, or the like may be applied.

As the polarizing beam splitter performing the polarization split, a Savart plate, a polarization beam displacer, a Nomarski prism, or the like may be applied.

As described above, the diffractive optical element B and the outgoing position compensator C cause the traveling directions and the outgoing positions of the first polarized light and the second polarized light of different wavelengths which are output from the first polarizing beam splitter A to coincide with each other. As the structure of the diffractive optical element B or the outgoing position compensator C, a structure in which the split angles of different wavelengths are first approximated by the diffractive optical element B and, at the stage subsequent to the diffractive optical element B, the outgoing positions are made to coincide with each other with respect to the first polarized light and the second polarized light, for example, by the outgoing position compensator having an isotropic refractive index distribution may be used. In the case of this structure, since the parameters can be independently controlled, there is an advantage that design thereof is made easy.

As described above, the above optical structure 100 includes the polarizing beam splitter A which splits the input light input from the incoming plane into the first polarized light and the second polarized light and in which the split angles that are the angles formed by the traveling directions of the rays of first polarized light and by the traveling directions of the rays of second polarized light are acute angles, and the diffractive optical element B that is disposed at the stage subsequent to the polarizing beam splitter A and has the plurality of light transmission regions separated at a prescribed pitch. By using the diffractive optical element B having a prescribed pitch, the diffractive optical element B can perform deflection while having a smaller size than a Wollaston prism while monitoring the invisible light, and application to various fields is expected. For example, a propagation path of the terahertz wave that is invisible can be checked by the visible light, and the adjustment of the optical axis or the like is facilitated. The optical structure can be applied to various devices such as a security inspection device or a terahertz wave differential interference imaging, and so on.

What is claimed is:

1. An optical structure comprising:
a polarizing beam splitter which splits input light input from an incoming plane thereof into first polarized light and second polarized light and in which split angles, which are angles formed by traveling directions of rays of the first polarized light and traveling directions of rays of the second polarized light, are acute angles; and
a diffractive optical element which is disposed at a stage subsequent to the polarizing beam splitter and has a plurality of light transmission regions separated at a prescribed pitch,
wherein, when first input light having a first wavelength ($\lambda 1$) is input to the polarizing beam splitter, and
when second input light having a second wavelength ($\lambda 2$) is input to the polarizing beam splitter,
the prescribed pitch of the diffractive optical element is set such that
the traveling direction of the first polarized light of the first input light and the traveling direction of the first polarized light of the second input light coincide with each other, and
the traveling direction of the second polarized light of the first input light and the traveling direction of the second polarized light of the second input light coincide with each other.

2. The optical structure according to claim 1, wherein:
the light transmission regions of the diffractive optical element constitute a single pattern;
all of the first polarized light of the first input light,
the first polarized light of the second input light,
the second polarized light of the first input light, and
the second polarized light of the second input light are disposed to be incident upon the single pattern of the diffractive optical element;
$\lambda 2$ is shorter than $\lambda 1$; and
the prescribed pitch (t) of the single pattern,
an incoming angle ($\alpha_{11}$) and an outgoing angle ($\beta_{11}$) of the first polarized light of the first input light for the diffractive optical element,
an incoming angle ($\alpha_{12}$) and an outgoing angle ($\beta_{12}$) of the second polarized light of the first input light for the diffractive optical element,
an incoming angle ($\alpha_{21}$) and an outgoing angle ($\beta_{21}$) of the first polarized light of the second input light for the diffractive optical element, and
an incoming angle ($\alpha_{22}$) and an outgoing angle ($\beta_{22}$) of the second polarized light of the second input light for the diffractive optical element satisfy these relational formulae when $m_{11}$, $m_{12}$, $m_{21}$, and $m_{22}$ are set to arbitrary natural numbers $$|\sin \alpha_{11} - \sin \beta_{11}| \neq m_{11} \lambda 1/t$$

$$|\sin \alpha_{12} - \sin \beta_{12}| \neq m_{12} \lambda 1/t$$

$$|\sin \alpha_{21} - \sin \beta_{21}| = m_{21} \lambda 2/t$$

$$|\sin \alpha_{22} - \sin \beta_{22}| = m_{22} \lambda 2/t.$$

3. The optical structure according to claim 2, wherein the polarizing beam splitter and the diffractive optical element are integrated without a junction plane.

4. The optical structure according to any one of claim 3, wherein the diffractive optical element is a diffraction grating or a spatial light modulator.

5. The optical structure according to any one of claim 2, wherein the diffractive optical element is a diffraction grating or a spatial light modulator.

6. The optical structure according to claim 1, wherein:
the diffractive optical element includes
a first diffractive optical element having a first pattern made up of some of the plurality of light transmission regions, and
a second diffractive optical element having a second pattern made up of the others of the plurality of light transmission regions;
the first polarized light of the first input light, and
the first polarized light of the second input light are disposed to be incident upon the first pattern of the first diffractive optical element;
the second polarized light of the first input light, and
the second polarized light of the second input light are disposed to be incident upon the second pattern of the second diffractive optical element; and
a pitch (t1) of the first pattern of the first diffractive optical element,
a pitch (t2) of the second pattern of the second diffractive optical element,
an incoming angle ($\alpha_{21}$) and an outgoing angle ($\beta_{21}$) of the first polarized light of the second input light for the first diffractive optical element, and
an incoming angle ($\alpha_{22}$) and an outgoing angle ($\beta_{22}$) of the second polarized light of the second input light for the second diffractive optical element satisfy the following relational formulae when $m_{21}$ and $in_{22}$ are set to arbitrary natural numbers $$t1 \neq t2$$

$$|\sin \alpha_{21} - \sin \beta_{21}| = m_{21}\lambda 2/t1$$

$$|\sin \alpha_{22} - \sin \beta_{22}| = m_{22}\lambda 2/t2.$$

7. The optical structure according to claim 6, wherein the polarizing beam splitter and the diffractive optical element are integrated without a junction plane.

8. The optical structure according to any one of claim 7, wherein the diffractive optical element is a diffraction grating or a spatial light modulator.

9. The optical structure according to any one of claim 6, wherein the diffractive optical element is a diffraction grating or a spatial light modulator.

10. The optical structure according to claim 1, wherein the polarizing beam splitter and the diffractive optical element are integrated without a junction plane.

11. The optical structure according to any one of claim 10, wherein the diffractive optical element is a diffraction grating or a spatial light modulator.

12. The optical structure according to any one of claim 1, wherein the diffractive optical element is a diffraction grating or a spatial light modulator.

* * * * *